3,167,160
INSULATED ELECTRIC CABLE AND REEL ASSEMBLY

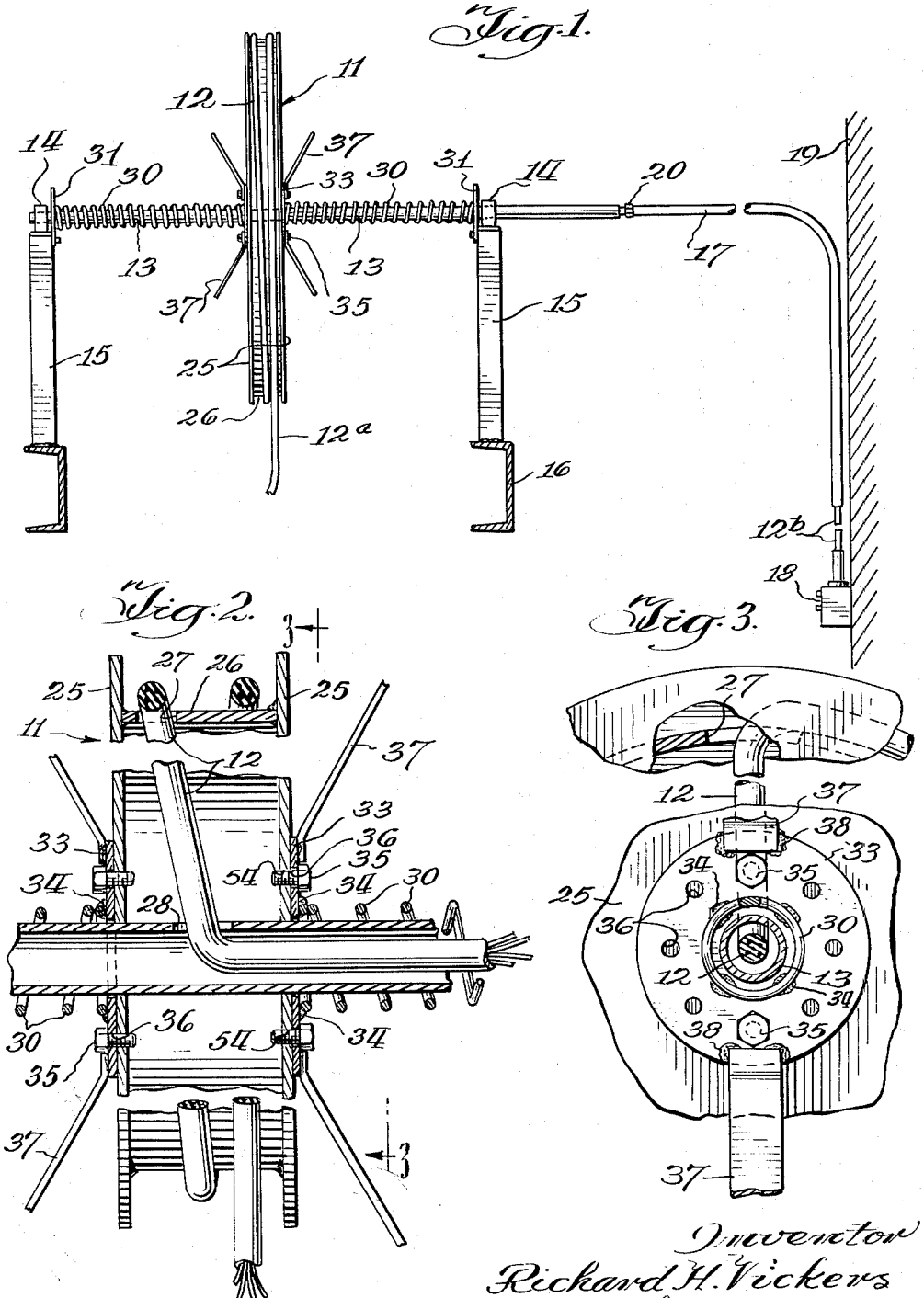

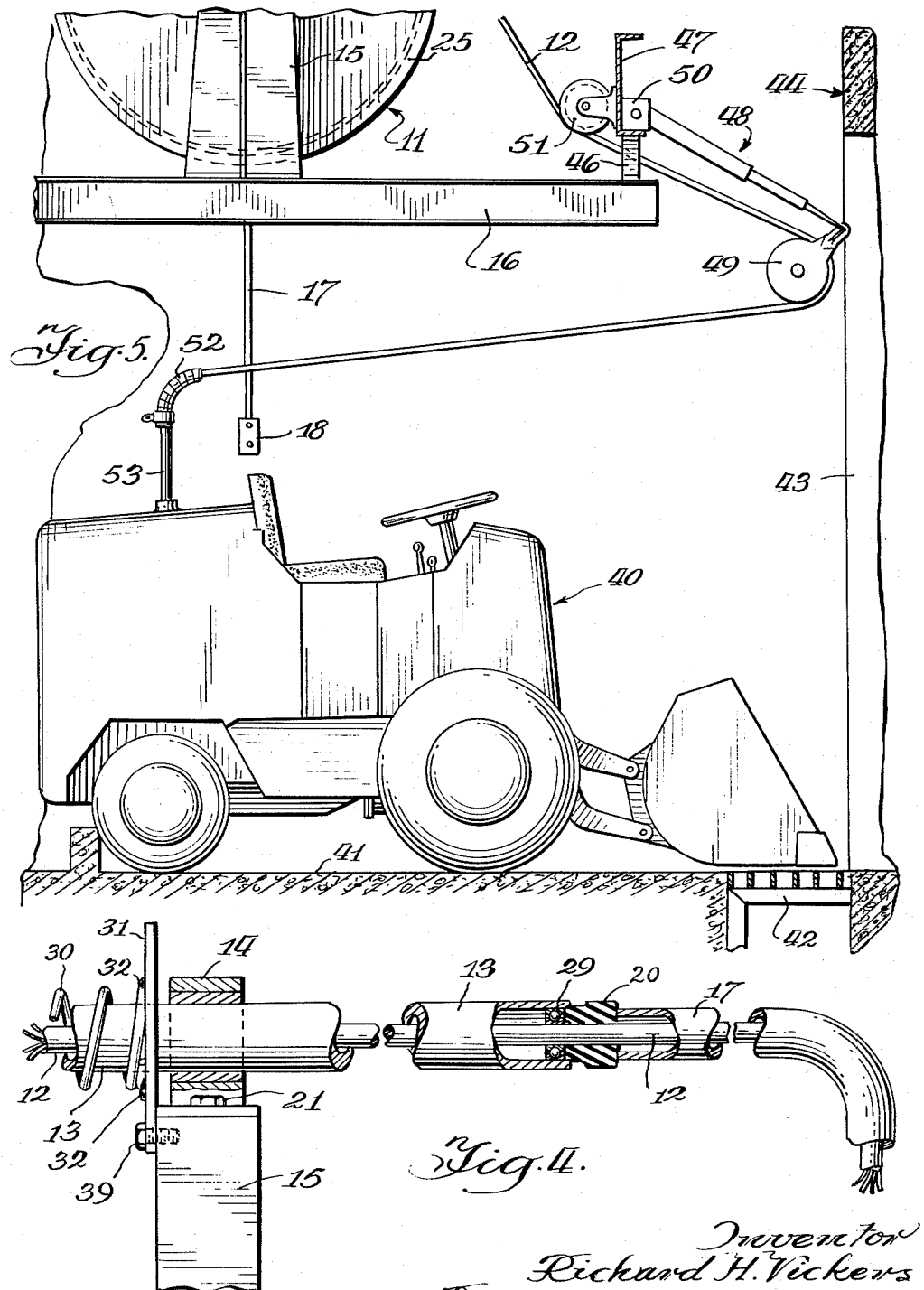

Richard H. Vickers, Mason City, Iowa, assignor to Allied Mills, Inc., Chicago, Ill., a corporation of Indiana
Filed June 27, 1961, Ser. No. 120,044
6 Claims. (Cl. 191—12.2)

The present invention relates generally to retracting reels for electric cables and more particularly to an insulated electric cable and reel assembly for movable electrically powered equipment, operated around dusty combustible material.

In ordinary retracting reel assemblies, a cable is wound around a rotatable reel with one end of the cable connected to the movable equipment to-be-powered and the other end connected to an electrical contact element rotating with the reel and constituting one part of a brush-ring electrical contact assembly, the other part being a stationary contact element connected to a power source. In constructions of this type there is a tendency for sparking to occur between the two contact elements of the brush-ring arrangement. Consequently, movable electrically powered equipment utilizing retracting reels including this arrangement or utilizing any other spark-causing arrangement cannot be safely used around dusty combustible material because of the danger of the material being ignited by the sparking.

The assembly constructed in accordance with the present invention eliminates the above described drawbacks and enables operation around dusty combustible material of movable electrically powered equipment. In the subject assembly there is no rotatable, non-insulated, electric contact element on the reel. The possibility of sparking is completely eliminated, and the entire assembly comes within the rigid safety standards necessary to obtain the desired insurance protection.

In the cable and reel assembly constituting the present invention a single insulated cable is wound around the reel and extends through a hollow reel axle and all the way to the power source. Between the reel and the power source the cable is engaged by locking means which holds that portion of the cable between the locking means and the power source against rotation, while permitting that portion of the cable between the locking means and the reel to turn or twist in response to rotation of the reel. The insulated cable of the subject assembly is quite flexible and can withstand a predetermined twist or turn continuously without damage to the cable.

The assembly includes retracting means adjustable so that when the electrically powered equipment is in a rest position adjacent the reel, the reel with the cable is urged to a retracted wound-up condition in which the cable portion between the reel and the locking means is maintained twisted said predetermined fraction of a turn in a rotative sense opposite that which the cable portion will be twisted in response to an unwinding of the reel. The circumference of the reel is equal to the distance between the reel and the work location farthest from the reel divided by two times said predetermined fraction of a turn. Accordingly, when the reel is unwound to enable the equipment connected to the cable to move from a location adjacent the reel to the farthest work location, the reel and the twisted cable portion undergo a rotation equal to two times said predetermined fraction of a turn, with the result that the twistable cable portion ends up twisted said predetermined fraction of a turn in the other rotative sense opposite the rotative sense in which it was twisted when the reel was in the rest condition. Thus the cable never undergoes twisting beyond the limits for which it was constructed. At the same time it provides a continuous, spark-proof, insulated connection between the electrically powered equipment and the power source.

Other features and advantages of the present invention are inherent in the structure claimed and disclosed, as will become apparent to those skilled in the art from the following detailed description in conjunction with the accompanying drawings wherein:

FIGURE 1 is a front view of one embodiment of a cable and reel assembly constructed in accordance with the present invention;

FIGURE 2 is an enlarged view, partially sectioned, of a portion of the assembly as shown in FIGURE 1;

FIGURE 3 is an end view of a portion of the assembly, as taken along line 3—3 in FIGURE 2;

FIGURE 4 is an enlarged view, partially in section, of another portion of the assembly as shown in FIGURE 1; and FIGURE 5 is a side view illustrating an embodiment of the subject assembly associated with an electrically powered piece of equipment.

Referring initially to FIGURE 1, there is shown an embodiment of a cable and retracting-reel assembly constructed in accordance with the present invention, and comprising a reel indicated generally at 11, around which is wound a flexible, insulated, electric power cable 12. Reel 11 is fixedly mounted on a hollow axle 13 rotatably mounted on bearings 14 each secured to the top of a respective stand 15 by bolts 21 (FIGURE 4), each stand 15 being supported by a respective channel shaped cross member 16. One end portion 12a of cable 12 extends from reel 11 for connection to electrically powered equipment, while the other end portion 12b of the cable extends through a part of hollow axle 13 and through a conduit 17 having opposite ends respectively terminating at axle 13 and at a power source such as a starting box 18 mounted along the side of a wall 19, and the end of cable portion 12b is connected to the power source. Located between reel 11 and starting box 18, more particularly between axle 13 and conduit 17, is cable-locking means 20 composed of electric insulating material such as rubber (FIGURE 4). The effect of locking means 20 is to hold that portion of the cable in conduit 17, between the locking means and the starting box 18 against twisting in response to rotation of the reel, while permitting that portion of the cable in axle 13, between the reel 11 and locking means 20, to turn or twist in response to rotation of the reel.

As shown in FIGURES 2 and 4, the interior of hollow axle 13 has a relatively large diameter or cross-sectional area compared to that of cable 12, to provide clearance for rotation of the cable in the axle; and the interior of conduit 17 has a relatively small cross-sectional area compared to the cross-sectional area of the axle. As indicated in FIGURE 1, axle 13, locking means 20 and conduit 17 provide a protective enclosure for the cable continuously, without interruption, from reel 11 to starting box 18.

Referring now to FIGURES 2 and 3, reel 11 comprises a pair of disc-shaped side members 25 and a circumferential cable-supporting surface 26 having an opening 27. That end of the cable which is to be connected to power source 18 is extended through opening 27 and an opening 28 in hollow axle 13 and toward the starting box 18. Referring to FIGURE 4, located in hollow axle 13 adjacent cable locking means 20 is bearing means 29 for supporting cable 12.

Reel 11 is normally urged toward a retracted, rest condition by a pair of coil springs 30 each mounted around hollow axle 13 on a respective opposite side of reel 11. Referring to FIGURES 2 and 4, each spring 30 has one end connected by weldments 32 to a plate 31 connected by a bolt 39 to one of the bearing stands 15 to fix the one spring end against rotation; and another end connected by weldments 34 to a disc-shaped plate 33 connected to the side of reel 11 by a bolt 35 extending through an opening 36 in plate 33 and on opening 54 in side member 25 of reel 11.

As previously indicated, the cable 12 is extremely flexible and may be continuously twisted a predetermined fraction of a turn without being damaged. When the reel 11 and the cable 12 are in a retracted, wound-up, rest condition, the cable portion between reel 11 and locking means 20 is maintained twisted said predetermined fraction of a turn in a rotative sense opposite that in which the reel 11 is rotated during unwinding. More specifically, reel 11 rotates in a counterclockwise sense, as viewed in FIGURE 3, during unwinding. Accordingly, the twistable portion of cable 12 is maintained twisted in a clockwise sense when the reel 11 is in the rest condition.

Retraction of reel 11 to the correct rest condition necessary to impart the desired twist to the twistable cable portion is determined by the reflection in coil springs 30. This reflection can be adjusted by utilizing adjusting handles 37 attached to disc-shaped plates 33 by weldments 38 and extending outwardly from the periphery of plate 33. More specifically, bolts 35 connecting disc-shaped plate 33 to reel side 25 are removed from the openings 54, 36 in reel side 25 and plate 33 respectively. Then the handles 37 are grasped and twisted so as to rotate the plate 33 to a position wherein a new opening 36 is aligned with the opening 54 in the reel side 25. This has the effect of varying the reflection in coil spring 30. This reflection is varied until it is the correct amount necessary to maintain the reel 11 in the desired rest condition. The bolt 35 is then inserted through the newly aligned opening 36, and through opening 54.

FIGURE 5 illustrates a typical embodiment of movable, electrically powered, material transferring equipment utilized in conjunction with the subject cable and reel assembly. In this embodiment a material transferring vehicle, such as the front loader indicated generally at 40, runs along a platform 41 and across a bridge 42 between a first work location such as a railroad car 44 having a doorway 43 and a second work location such as a bin or hopper (not shown). In the illustrated embodiment, assembly-supporting channel-shaped cross members 16 are suspended by straps 46 from channel-shaped stringers 47 on one of which is secured brackets 50 (only one of elements 46, 47 and 50 are shown) mounting one end of a slidably adjustable arm assembly indicated generally at 48. At the other end of arm 48 is a sheave 49.

Also mounted on stringer 47 is idler roller 51. Cable 12 extends from the reel 11 past idler roller 51, around sheave 49, through a flexible conduit 50 attached to a hollow post 53 mounted on vehicle 40, and through the hollow post 40 to an electric motor within the vehicle 40. Arm assembly 48, sheave 49, vehicle 40, and the parts associated therewith are described in greater detail in application Serial No. 100,929, filed April 5, 1961, now Patent No. 3,136,435 issued June 9, 1964.

Reel is retracted to a rest condition when the electrically powered vehicle 40 is situated in a rest position directly below the reel, as shown in FIGURE 5. As previously indicated, when reel 11 is in a retracted condition, the cable portion between the reel and locking means 20 is maintained twisted a predetermined fraction of a turn (within the limits to which the cable may be twisted without damage), in a rotative sense opposite that which the reel turns in response to movement of the vehicle 40 from the reel to either of its work locations. The circumference of the reel, relative to the distance between it and the farthest work location, is such that the reel will undergo a rotation, in response to unwinding, equal to two times the predetermined fraction to which the twistable cable portion is turned. The circumference of the reel can be defined by the equation $$C = \frac{d}{2f}$$

where $C$ equals the circumference of the reel, $d$ equals the distance between the reel and the work location farthest from the reel, and $f$ equals the predetermined twist to which the cable may be subjected without being damaged.

Assuming, for purposes of illustration, that the twistable cable portion is about 6 feet long and that the cable may be turned a three-quarter twist without being damaged (this type of cable is commercially available and is known as a mine-type cord), then if the distance between the reel and the farthest work location is 27 feet, the circumference of the reel need only be about 18 feet (a diameter of less than 6 feet) to satisfy all operating conditions. Although the cable undergoes a total twist of one and one-half turns, since it was initially twisted three-quarters of a turn in a direction opposite that in which it will be twisted in response to an unwinding rotation of the reel, the resultant twist in the cable is still only three-quarters of a turn, which is within the twisting limits for which it was constructed.

The equipment just described can be readily utilized around dusty combustible material because it is powered by a single cable extending without interruption all the way from the connection with the electrically powered equipment (e.g. vehicle 40) to the connection with the power source (e.g. starter box 18). There are no ring-brush electrical contact arrangements, or other arrangements which would produce sparking. Thus the vehicle 40 may be safety utilized to transfer dusty combustible material such as ingredients used in the manufacture of livestock feed.

It should be understood that the subject assembly may be utilized with movable electrically powered equipment other than material transferring vehicles. The foregoing detailed description has been given for clearness of understanding only, and no unnecessary limitation should be understood therefrom, as modifications will be obvious to those skilled in the art.

What is claimed is:

1. In combination:
   a flexible, insulated electric cable for conducting electric power to an apparatus movable between a plurality of work locations;
   a reel for said cable;
   a hollow axle;
   means mounting said axle for rotation;
   means mounting said reel on said axle for rotation therewith;
   means normally urging said reel in a first rotative sense toward a rest condition;
   a conduit in communication with said hollow axle;
   said cable being wound around the circumference of said reel and having one end extending from said reel for connection to the electric-powered apparatus and another end extending through said axle and said conduit for connection to a power source;
   said cable including a portion in said axle and a portion in said conduit;
   means between the axle and the conduit for locking the cable portion in the conduit against rotation while permitting rotation of the cable portion in the axle;
   said axle mounting means including means mounting the axle and reel for movement in a second rotative sense, opposite said first rotative sense, in response to an unwinding pull on said cable;

said flexible cable being capable of twisting a predetermined twist without being damaged;

said cable portion in the axle normally being twisted, relative to the cable portion in the conduit, said predetermined twist in said first rotative sense when the reel is in said rest condition;

the circumference of the reel being at least about $d/2f$ where $d$ equals the distance between the reel and the work location farthest from the reel, and $f$ equals said predetermined twist;

whereby said cable portion in the axle ends up twisted no more than said predetermined twist in said second rotative sense, when the cable is unwound.

2. In combination:

a flexible, insulated electric cable for conducting electric power to an apparatus movable between a plurality of work locations;

a reel for said cable;

a hollow axle;

means mounting said axle for rotation;

means mounting said reel on said axle for rotation therewith;

means normally urging said reel in a first rotative sense toward a rest condition;

a conduit in communication with said hollow axle;

said cable being wound around the circumference of said reel and having one end extending from said reel for connection to the electric-powered apparatus and another end extending through said axle and said conduit for connection to a power source;

said cable including a portion in said axle and a portion in said conduit;

means between the axle and the conduit for locking the cable portion in the conduit against rotation while permitting rotation of the cable portion in the axle;

said axle mounting means including means mounting the axle and reel for movement in a second rotative sense, opposite said first rotative sense, in response to an unwinding pull on said cable;

said flexible cable being capable of twisting at least three-quarters of a turn without damage thereto;

said cable portion in the axle normally being twisted, relative to the cable portion in the conduit, up to three-quarters of a turn in the first rotative sense when the reel is in said rest condition;

the circumference of the reel being at least about two-thirds times the distance between the reel and the work location farthest from the reel;

whereby said cable portion in the axle ends up twisted no more than three-quarters of a turn in said second rotative sense, when the cable is unwound.

3. In combination:

a flexible, insulated electric cable for conducting electric power to an apparatus movable between a plurality of work locations;

a hollow axle;

a reel for said cable on said hollow axle;

means, including said axle, mounting said reel for rotation;

means normally urging said reel in a first rotative sense toward a retracted condition;

said cable being wound around the circumference of said reel and having one end extending from said reel for connection to the electric-powered apparatus and another end extending from the reel along said hollow axle for connection to a power source;

locking means between the reel and said other cable end for holding that portion of the cable between said locking means and the other cable end against rotation while permitting rotation of that portion of the cable extending between the reel and said locking means;

said mounting means for the reel including means mounting said reel for movement in a second rotative sense, opposite said first rotative sense, in response to an unwinding pull on said cable;

said flexible cable being capable of twisting a predetermined twist without being damaged;

said cable portion between the reel and the locking means normally being twisted, relative to the cable portion between the locking means and said other cable end, said predetermined twist in said first rotative sense when the reel means is in its retracted condition;

the circumference of the reel being at least about $d/2f$ where $d$ equals the distance between the reel and the work location farthest from the reel, and $f$ equals said predetermined twist;

whereby said cable portion between the reel and the locking means ends up twisted no more than said predetermined twist in said second rotative sense, when the cable is unwound.

4. In combination:

a hollow axle;

means mounting said axle for rotation;

a reel;

means mounting said reel on said axle for rotation therewith;

means normally urging said reel in a first rotative sense toward a rest condtiion;

a conduit having a pair of opposite ends with one of said ends terminating at a junction with said hollow axle;

a flexible electric cable wound around said reel;

said cable including a portion extending from the reel through a part of the hollow axle and a portion extending through said conduit to a cable end;

the interior of said hollow axle having a relatively large cross-sectional area compared to that of the cable to provide clearance for rotation of the cable within the axle;

said conduit having a relatively small interior cross-sectional area compared to that of the axle;

and means, at said junction of the axle and the conduit, for locking the portion of the cable in the conduit against rotation while permitting rotation of the portion of the cable in the axle;

said cable being untwisted from said locking means to said cable end.

5. In the combination of claim 4 wherein:

said locking means is composed of electric insulating material;

and said axle, said locking means and said conduit include means cooperating to protectively enclose the cable continuously, without interruption, from said reel to the other of the opposite ends of the conduit.

6. In combination:

a hollow axle;

means mounting said axle for rotation;

a reel having a pair of sides;

means mounting said reel on said axle for rotation therewith;

a disk-shaped plate mounted on said axle, adjacent a side of said reel, and rotatable relative to said reel side through a plurality of rotated positions;

a coil spring having a pair of opposite ends, said spring being disposed around said axle;

means fixing one end of said coil spring, remote from said reel, against rotation;

means attaching the other end of said coil spring to said disk-shaped plate;

means for securing said disk-shaped plate to said reel side in any one of a plurality of said rotated positions of the disk-shaped plate;

a handle extending outwardly from the periphery of the disk-shaped plate;

a flexible electric cable wound around said reel;

said cable including a portion extending from said reel through said axle to an end of the axle and a portion, integral with said first recited portion, extending from said axle end outside the axle;

and means at said axle end for locking said portion of the cable outside the axle against rotation while permitting rotation of said cable portion in the axle.

References Cited in the file of this patent

UNITED STATES PATENTS

| | | |
|---|---|---|
| 1,205,803 | Skjonhaug | Nov. 21, 1916 |
| 2,121,993 | Stocks | June 28, 1938 |
| 2,141,909 | Hauser | Dec. 27, 1938 |
| 2,572,856 | Hallberg | Oct. 30, 1951 |
| 2,651,127 | Rubin et al. | Sept. 8, 1953 |
| 2,941,746 | Hunt | June 21, 1960 |
| 2,955,271 | Dawkins | Oct. 4, 1960 |

FOREIGN PATENTS

| | | |
|---|---|---|
| 346,719 | Germany | May 4, 1920 |
| 588,354 | France | Jan. 30, 1925 |
| 573,948 | Great Britain | Dec. 13, 1945 |
| 691,817 | Great Britain | May 20, 1953 |